(12) United States Patent
Ishiguro

(10) Patent No.: US 9,038,499 B2
(45) Date of Patent: May 26, 2015

(54) OPENING AND CLOSING APPARATUS

(71) Applicant: Mitsui Kinzoku Act Corporation, Yokohama-shi, Kanagawa (JP)

(72) Inventor: Katsuyuki Ishiguro, Novi, MI (US)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 178 days.

(21) Appl. No.: 13/792,583

(22) Filed: Mar. 11, 2013

(65) Prior Publication Data

US 2014/0251036 A1  Sep. 11, 2014

(51) Int. Cl.
*B60K 15/05* (2006.01)
*E05C 19/02* (2006.01)

(52) U.S. Cl.
CPC ......... *B60K 15/05* (2013.01); *B60K 2015/0515* (2013.01); *Y10T 74/18296* (2015.01); *E05C 19/02* (2013.01)

(58) Field of Classification Search
CPC .............................. E05B 83/34; E05C 19/022
USPC ............ 74/550, 110, 567, 527; 220/262, 263, 220/264, 315; 296/97.22; 292/57, 58
See application file for complete search history.

(56) References Cited

U.S. PATENT DOCUMENTS

| 8,353,553 | B2 * | 1/2013 | Beck | 296/97.22 |
| 8,485,585 | B2 * | 7/2013 | Taniguchi et al. | 296/97.22 |
| 8,585,119 | B2 * | 11/2013 | Beck | 296/97.22 |
| 8,845,001 | B2 * | 9/2014 | Kotama et al. | 296/97.22 |
| 2009/0139991 | A1 | 6/2009 | Nakaya | |

FOREIGN PATENT DOCUMENTS

WO  WO-2008/059543  5/2008

* cited by examiner

*Primary Examiner* — Thomas Diaz
(74) *Attorney, Agent, or Firm* — Foley & Lardner LLP

(57) ABSTRACT

There is provided an opening and closing apparatus for a fuel lid, including: a pushrod configured to shift between a locking posture and an unlocking posture and to reciprocate between a pushed-in position and a pushed-out position; a follower assembled to the pushrod so as to rotate relatively to the pushrod about the center line and to move together with the pushrod in the axial directions; and a case supporting the pushrod, the follower and a biasing member. The case includes a rod cam portion for rotating the pushrod and a follower cam portion for rotating the follower. The follower cam portion includes a plurality of follower securing portions for securing the follower so as to hold the pushrod in the pushed-in position against biasing force exerted by the biasing member.

15 Claims, 12 Drawing Sheets

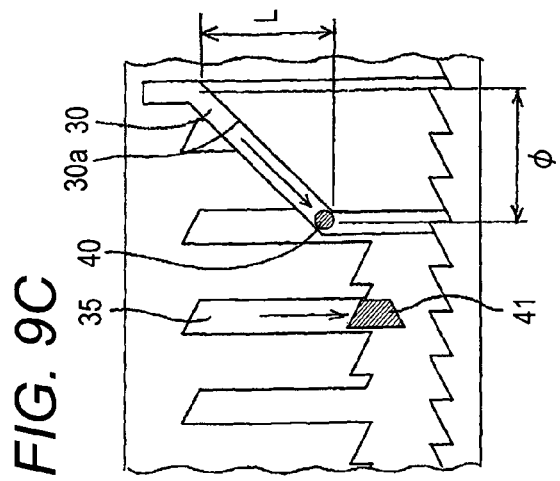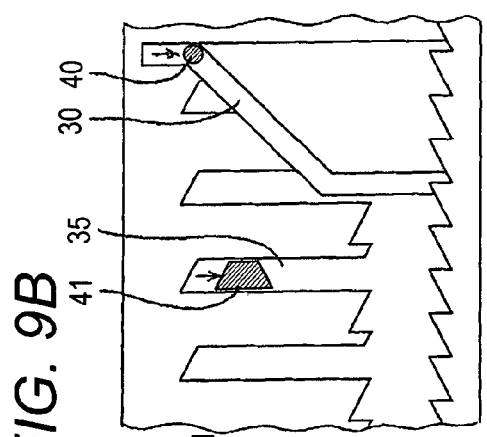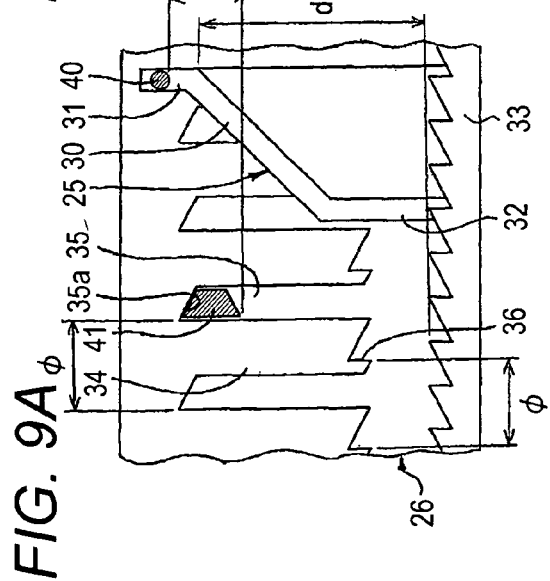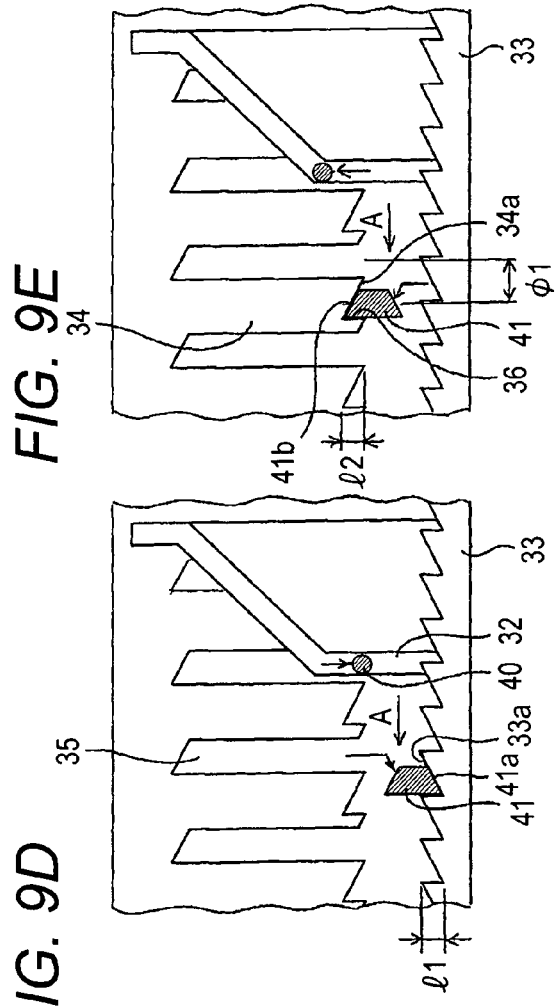

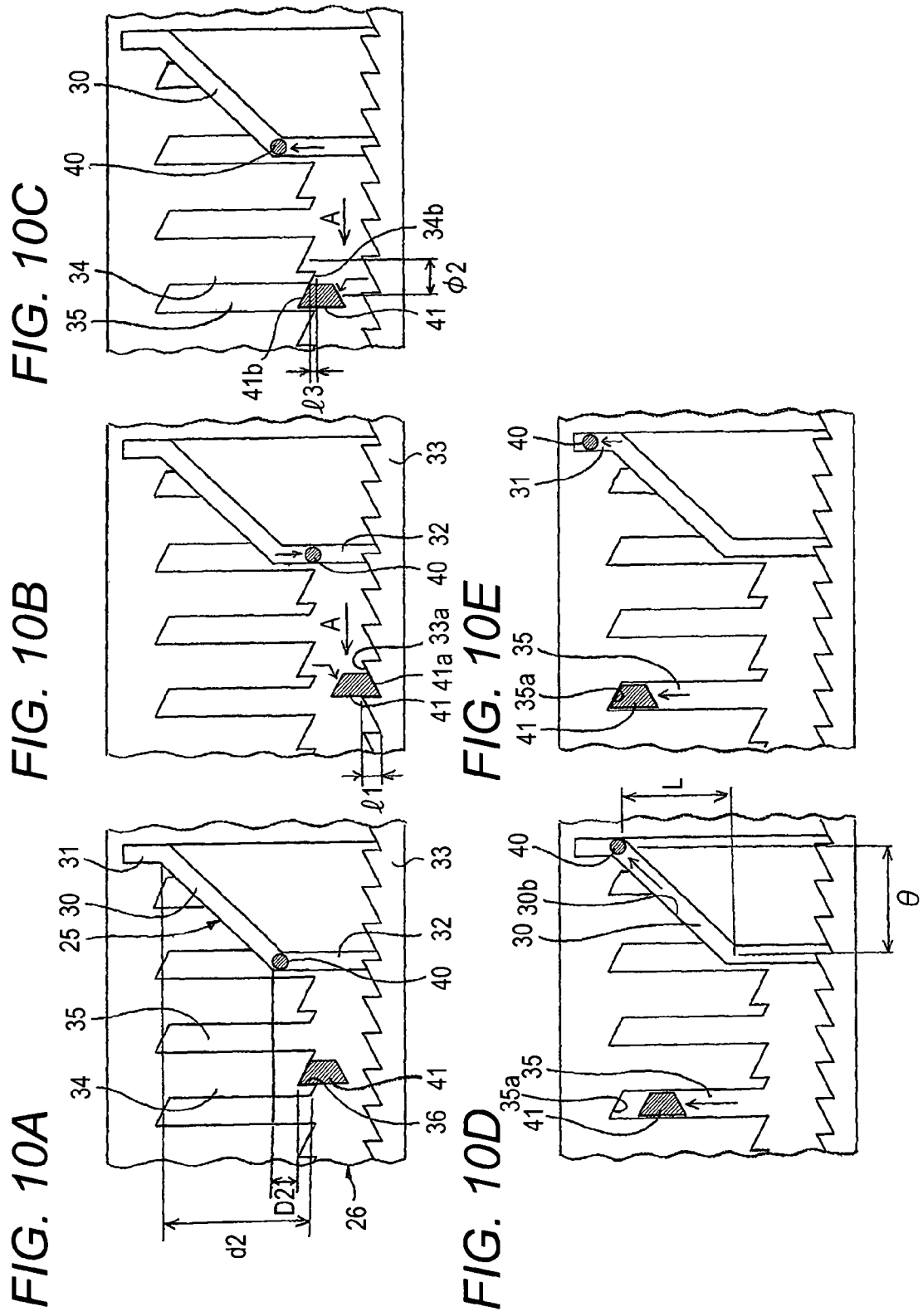

OPENING AND CLOSING APPARATUS

TECHNICAL FIELD

The present invention relates to an opening and closing apparatus for a fuel lid and an opening and closing apparatus for a flap such as a door and a lid which opens and closes in a front-to-rear direction.

BACKGROUND ART

In vehicles such as motor vehicles, in general, a fuel lid which covers a fuel filler port is attached to a vehicle body via a hinge so as to rotate about the hinge as a fulcrum to open and close in a front-to-rear direction. In addition, as an opening and closing apparatus for such a fuel lid, there is known an opening and closing apparatus including a pushrod for pushing a fuel lid in an opening direction. In this opening and closing apparatus, the pushrod is pushed in as a result of the fuel lid being pushed in a closing direction and is then held in the pushed-in position so as to close the fuel lid, and the pushrod is pushed out as a result of the fuel lid being pushed again so as to open the fuel lid (refer to WO2008/059543A1 and US2009/0139991A1, for example).

An opening and closing apparatus described in WO2008/059543A1 includes a heart cam having a heart-shaped cam groove, a tappet which engages with the cam groove of the heart cam and a rocker which connects the tappet and a pushrod together, and a step is formed at a predetermined location in the cam groove. The tappet is moved in the cam groove as the pushrod is moved in a pushed-in direction, which is a direction in which the pushrod is pushed in, and a pushed-out direction, which is a direction in which the pushrod is pushed out, and is secured to the step portion in the cam groove to thereby hold the pushrod in a pushed-in position. Further, a lid securing portion for securing a fuel lid is provided at a distal end portion of the pushrod. The pushrod is rotated forwards a predetermined rotational angle (for example, 90°) about a center line while it is being shifted from a pushed-out position to the pushed-in position, whereby the pushrod brings the lid securing portion into engagement with the fuel lid to lock the fuel lid. In addition, the pushrod is rotated backwards the predetermined rotational angle about the center line while it is being shifted from the pushed-in position to the pushed-out position, whereby the lid securing portion is disengaged from the fuel lid to unlock the fuel lid.

An opening and closing apparatus described in US2009/0139991A1 includes a holder, which accommodates therein a pushrod, and a sleeve. The holder is provided with a first guide portion, which is made up of a plurality of inclined surfaces which are formed into a spiral shape. The pushrod is provided with a plurality of guide projections, which are adapted to individually engage with the inclined surface. The pushrod is rotated a predetermined rotational angle (for example, substantially 45°) in one direction by the first guide portion of the holder every time a fuel lid is pushed in. Further, the sleeve is provided with a second guide portion, which is made up of a plurality of long grooves and a plurality of shallow grooves formed and extended along the pushrod, and these long and shallow grooves are disposed alternately in a circumferential direction. In the pushrod, the group of guide projections is brought into engagement with the group of long grooves and the group of shallow grooves in an alternate fashion in response to a rotation made every time the fuel lid is pushed in. The fuel lid is held in a pushed-in position by bringing the group of guide projections into engagement with the group of shallow grooves. Further, the fuel lid is allowed to move towards a pushed-out position by bringing the group of guide projections into engagement with the group of long grooves.

In the opening and closing apparatus described in WO2008/0595431A1, the pushrod and the tappet are interlocked via the rocker, and the pushrod is held in the pushed-in position by securing the tappet, resulting in the complex mechanism. Due to this, it becomes difficult to reduce a size of the apparatus.

In the opening and closing apparatus described in US2009/0139991A1, although the apparatus is not configured such that the fuel lid is locked by using the pushrod, as with the opening and closing apparatus described in WO2008/059543A1, the opening and closing apparatus can be configured so that the lid securing portion is provided at the distal end portion of the pushrod which is rotated every time the fuel lid is pushed in so as to lock the fuel lid. In this case, the rotation of the pushrod made to engage the lid securing portion with the fuel lid or disengage the lid securing portion from the fuel lid is based on the engagement of the group of guide projections with the first guide portion and follows the rotation of the pushrod made to engage the group of guide projections with the group of long grooves and the group of shallow grooves of the second guide portion alternately.

Here, in a case where the rotational angle of the pushrod is small, a sufficient engagement margin between the fuel lid and the lid securing portion is not obtained, leading to fears that the locking strength becomes insufficient. In a case where the rotational angle of the pushrod is increased to ensure the engagement margin between the fuel lid and the pushrod, in relation to the length of the inclined surfaces of the first guide portion with respect to the moving direction of the pushrod, the gradient of the inclined surfaces becomes too moderate, resulting in fears that the proper movement and rotation of the pushrod is interrupted.

There are also fears that in a case where the pushing in of the fuel lid is interrupted halfway through a closing operation of the fuel lid, the pushrod is held in the pushed-in position without engaging the lid securing portion with the fuel lid. Then, when the fuel lid is opened, there are fears that the fuel lid pushed by the pushrod is forced to spring up to open.

SUMMARY OF INVENTION

In view of the above-described situations, it is an object of an aspect of the invention to provide an opening and closing apparatus that is small in size and which has superior reliability in operation.

In view of the above object, according to an aspect of the invention, there is provided an opening and closing apparatus for a fuel lid, comprising: a pushrod having a securing portion for securing the fuel lid, wherein the pushrod is rotatable about a center line so as to shift between a locking posture where the securing portion is brought into engagement with the fuel lid and an unlocking posture where the securing portion is disengaged from the fuel lid, and wherein the pushrod is also movable in axial directions so as to reciprocate between a pushed-in position where the fuel lid is closed and a pushed-out position where the fuel lid is opened; a follower assembled to the pushrod so as to rotate relatively to the pushrod about the center line and to move together with the pushrod in the axial directions; a biasing member configured to bias the pushrod in a direction in which the pushrod is pushed out; and a case configured to support the pushrod, the follower and the biasing member. The case comprises: a rod cam portion configured to rotate the pushrod to the locking posture in response to a forward motion of the pushrod from the pushed-out position to the pushed-in position and to rotate the pushrod to the unlocking posture in response to a backward motion of the pushrod from the pushed-in position to the pushed-out position; and a follower cam portion configured to rotate the follower in a predetermined rotational direction about the center line in response to the forward motion and the backward motion of the pushrod. The follower cam portion comprises a plurality of follower securing portions configured to secure the follower so as to hold the pushrod in the pushed-in position against biasing force exerted by the biasing member, wherein the plurality of follower securing portions are provided at intervals of a rotational angle of the follower rotating about the center line in association with one reciprocating movement of the pushrod between the pushed-in position and the pushed-out position.

In addition, in view of the above object, according to another aspect of the invention, there is provided an opening and closing apparatus for a flap, comprising: a pushrod having a securing portion for securing the flap which opens and closes in front-to-rear directions, wherein the pushrod is rotatable about a center line so as to shift between a locking posture where the securing portion is brought into engagement with the flap and an unlocking posture, and wherein the pushrod is also movable along the center line so as to reciprocate between a pushed-in position where the flap is closed and a pushed-out position where the flap is opened; a follower assembled to the pushrod so as to rotate relatively to the pushrod about the center line and to move together with the pushrod in axial directions; a biasing member configured to bias the pushrod in a direction in which the pushrod is pushed out; and a case configured to support the pushrod, the follower and the biasing member. The case comprises: a rod cam portion configured to rotate the pushrod to the locking posture in response to a forward motion of the pushrod from the pushed-out position to the pushed-in position and to rotate the pushrod to the unlocking posture in response to a backward motion of the pushrod from the pushed-in position to the pushed-out position; and a follower cam portion configured to rotate the follower in a predetermined rotational direction about the center line in response to the forward motion and the backward motion of the pushrod. The follower cam portion comprises a plurality of follower securing portions configured to secure the follower so as to hold the pushrod in the pushed-in position against biasing force exerted by the biasing member, wherein the plurality of follower securing portions are provided at intervals of a rotational angle of the follower rotating about the center line in association with one reciprocating movement of the pushrod between the pushed-in position and the pushed-out position.

According to the aspect of the invention, it is possible to provide the opening and closing apparatus that is small in size and which has superior reliability in operation.

BRIEF DESCRIPTION OF DRAWINGS

FIGS. 9A to 9E Diagrams showing exemplarily an operation of a cam mechanism which rotates the pushrod and the follower of the opening and closing apparatus shown in FIG. 3.

FIGS. 10A to 10E Diagrams showing exemplarily an operation of the cam mechanism which rotates the pushrod and the follower of the opening and closing apparatus shown in FIG. 3.

DESCRIPTION OF EXEMPLARY EMBODIMENTS

Figure 1:
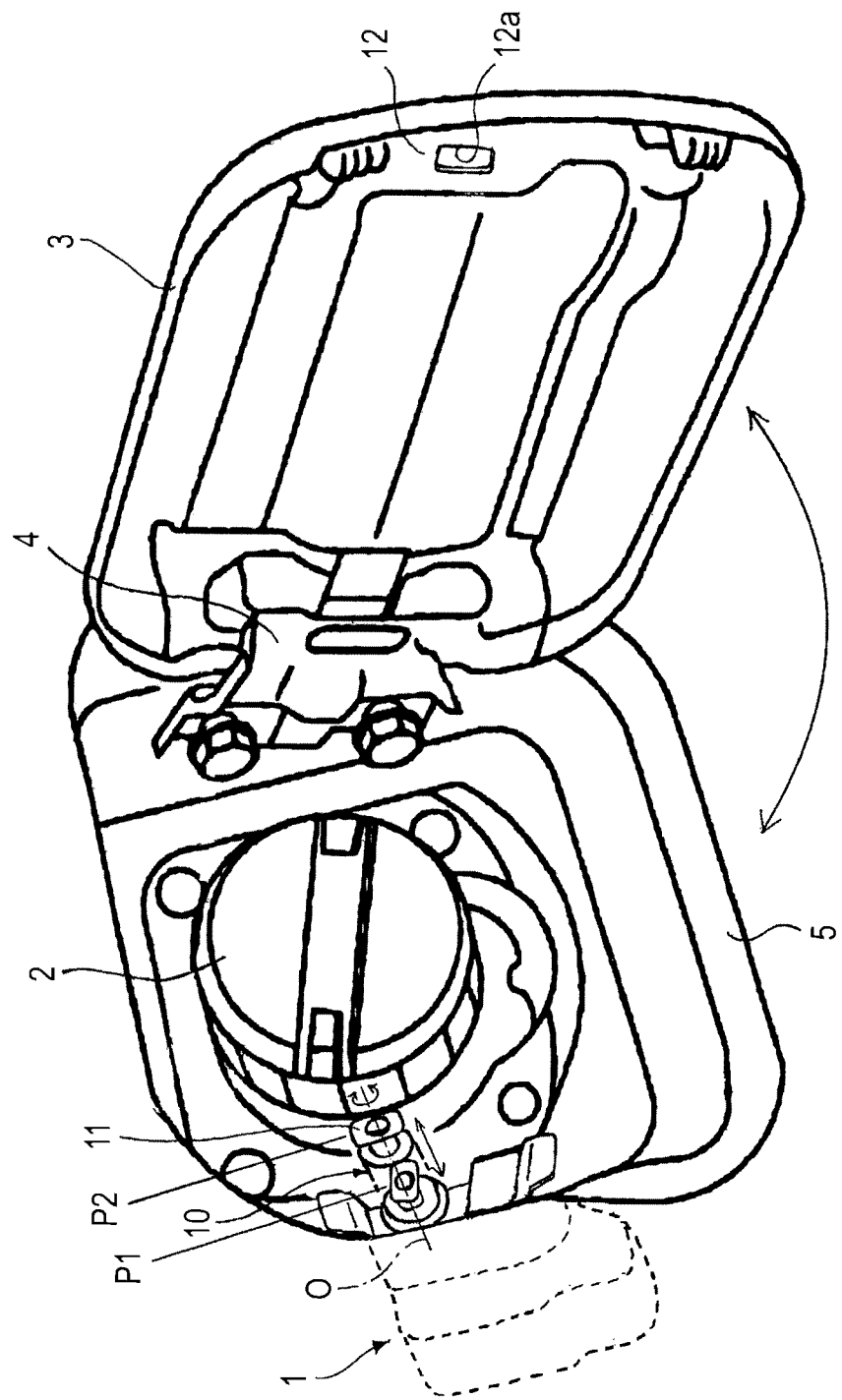
FIG. 1 A diagram showing a configuration of one example of an opening and closing apparatus according to an exemplary embodiment.

FIG. 1 shows a configuration of an example of an opening and closing apparatus according to an exemplary embodiment.

An opening and closing apparatus 1 shown in FIG. 1 is an opening and closing apparatus for a fuel lid 3 configured to cover a fuel filler port 2 of a motor vehicle. The fuel lid 3 is attached to a vehicle body 5 via a hinge 4 and opens and closes about the hinge 4 as a fulcrum in front-to-rear directions. The opening and closing apparatus 1 is disposed so as to face a rear surface of a free end portion of the fuel lid 3. The opening and closing apparatus 1 is assembled to the vehicle body 5.

The opening and closing apparatus 1 includes a pushrod 10 which pushes the fuel lid 3 in an opening direction. The pushrod 10 is provided so as to move in axial directions and is pushed in when the fuel lid 3 is pushed in a closing direction. The opening and closing apparatus 1 closes the fuel lid 3 by holding the pushrod 10, which has been pushed in, in a pushed-in position P1 and opens the fuel lid 3 by pushing out the pushrod 10 to a pushed-out position P2 when the fuel lid 3 is pushed in again.

Further, the pushrod 10 is provided so as to rotate about a center line O. The pushrod 10 is rotated in association with an axial movement thereof which occurs when the pushrod 10 reciprocates between a pushed-in position P1 and a pushed-out position P2. Further, a lid securing portion 11 for securing the fuel lid 3 is provided at a distal end portion of the pushrod 10. The pushrod 10 is configured to bring the lid securing portion 11 into engagement with the fuel lid 3 to thereby lock the fuel lid 3 or configured to disengage the lid securing portion 11 from the fuel lid 3 to thereby unlock the fuel lid 3, in accordance with a rotation thereof.

In the illustrated example, the lid securing portion 11 has a substantially rectangular plate-like shape which is rotationally symmetric with respect to the center line O of the pushrod 10. A secured portion 12 of the fuel lid 3 for an engagement with the lid securing portion 11 is provided with an opening 12a having a substantially rectangular shape which is slightly larger than the lid securing portion 11. The secured portion 12 is configured to accommodate therein the lid securing portion 11.

Figure 2:
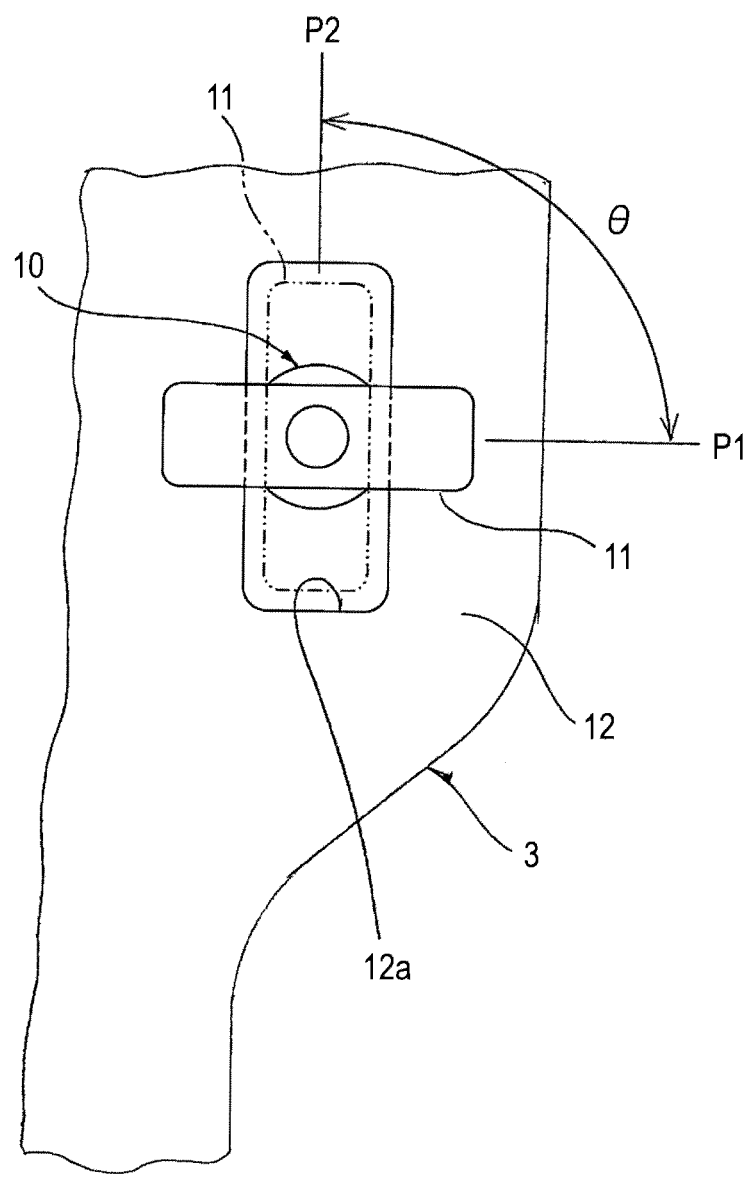
FIG. 2 A diagram showing an operation of a pushrod of the opening and closing apparatus shown in FIG. 1.

FIG. 2 shows an operation of the pushrod 10 when the fuel lid 3 is locked and unlocked.

When the pushrod 10 is in the pushed-out position P2, the pushrod 10 takes a posture (an unlocking posture) in which longer sides of the lid securing portion 11 are substantially parallel to longer sides of the opening 12a in the secured portion 12 of the fuel lid 3.

As the fuel lid 3 is pushed in, firstly, the lid securing portion 11 of the pushrod 10 passes through the opening 12a in the secured portion 12 of the fuel lid 3 and is then accommodated in the secured portion 12. As the fuel lid 3 is pushed in further, the pushrod 10 is pushed in and is then held in the pushed-in position P1. In the process of this forward motion from the pushed-out position P2 to the pushed-in position P1, the pushrod 10 is rotated by a predetermined angle θ. The pushrod 10 which is held in the pushed-in position P1 is taking a posture (a locking posture) in which the longer sides of the lid securing portion 11 intersect the longer sides of the opening in the locked member 12 of the fuel lid 3, whereby the lid securing portion 11 is in engagement with the secured portion 12. By doing so, the fuel lid 3 is locked in a closed state. In this embodiment, the rotational angle θ of the pushrod 10 is substantially 90°.

As the fuel lid 3 is pushed in again, the pushrod 10 is moved to the pushed-out position P2 after it has been pushed in once. In the process of this backward motion of the pushrod 10 from the pushed-in position P1 to the pushed-out position P2, the pushrod 10 is rotated by the predetermined angle in an opposite direction to the direction in which the pushrod 10 is rotated during the forward operation thereof to thereby be shifted to the unlocking posture, whereby the lid securing portion 11 is disengaged from the secured portion 12 of the fuel lid 3. According thereto, the fuel lid 3 is unlocked.

Figure 3:
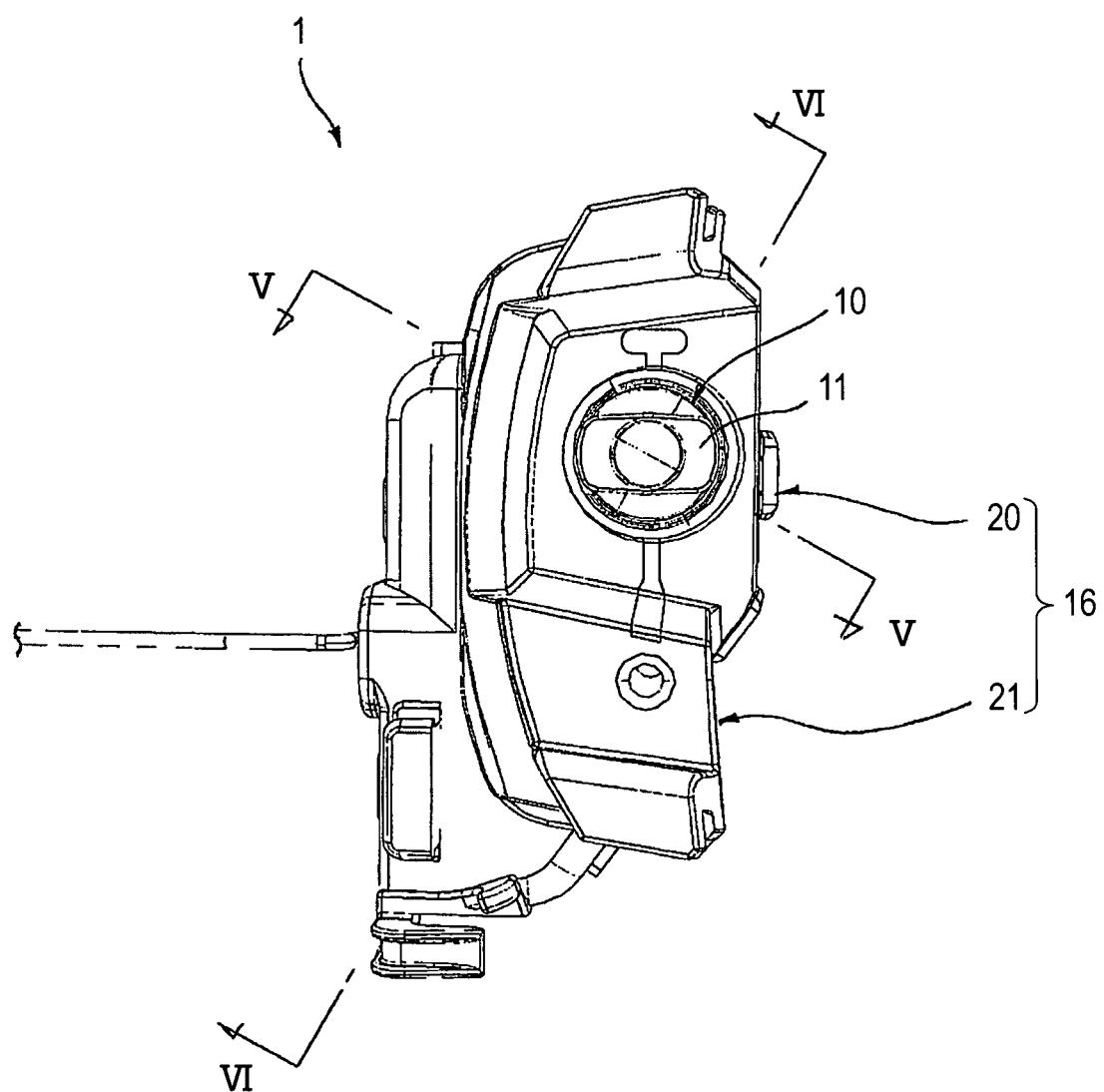
FIG. 3 A diagram showing a detailed configuration of the opening and closing apparatus shown in FIG. 1.
Figure 4:
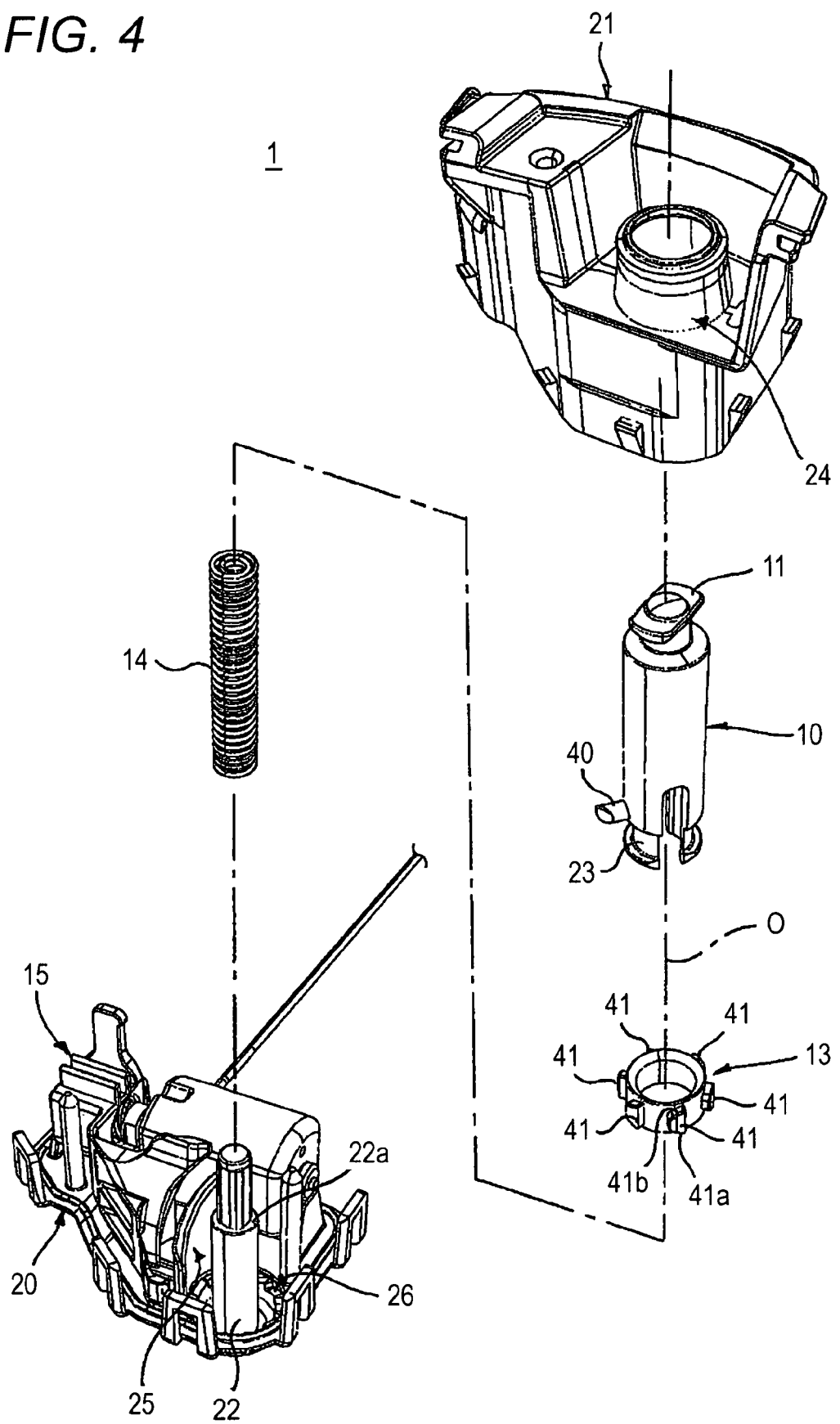
FIG. 4 An exploded perspective view of the opening and closing apparatus shown in FIG. 3.

FIGS. 3 and 4 show a detailed configuration of the opening and closing apparatus 1.

The opening and closing apparatus 1 includes the pushrod 10, a follower 13, a coil spring (a biasing member) 14 for biasing the pushrod 10 in a pushed-out direction in which the pushrod 10 is pushed out, a locking portion 15 for locking the pushrod 10 which is held in the pushed-in position P1 and a case 16.

The case 16 includes a base (a first member) 20 configured to receive a reaction force of the coil spring 14 and a holder (a second member) 21 for fixing the base 20 to the vehicle body 5. The base 20 has a support shaft 22. The support shaft 22 is disposed concentrically with the pushrod 10. The holder 21 is assembled to the base 20 in an axial direction of the support shaft 22.

The pushrod 10 has a substantially cylindrical shape, in which the distal end portion thereof where the lid securing portion 11 is provided is closed. The pushrod 10 fits on the support shaft 22 that is provided on the base 20. The pushrod 10 is supported by the support shaft 22 so as to move in an axial direction and to rotate about the center axis O.

The coil spring 14 is accommodated in an interior of the pushrod 10, which fits on the support shaft 22. The coil spring 14 is held between a step portion 22a, which is formed at an axially central portion of the support shaft 22, and the distal end portion of the pushrod 10. The coil spring 14 is compressed as the pushrod 10 moves in a pushed-in direction, in which the pushrod 10 is pushed in, so as to bias the pushrod 10 in the pushed-out direction.

The follower 13 is configured to rotate relatively to the pushrod 10 about the center line O and to move in an axial direction of the pushrod 10 together with the pushrod 10. In the illustrated example, a fitting groove 23 is formed in an outer circumferential surface of a proximal end portion of the pushrod 10 so as to extend circumferentially. The follower 13 has a ring shape and fits in the fitting groove 23 on the pushrod 10.

Incidentally, although the follower 13 may be aligned with the pushrod 10 in the axial direction of the pushrod 10, by fitting the follower 13 in the fitting groove 23 on the pushrod 13 as in the illustrated example, an overall length of the pushrod 10 and the follower 13 can be shortened, thereby making it possible to reduce a size of the opening and closing apparatus 1.

An accommodating portion 24 is provided on the case 16 for accommodation of the pushrod 10 and the follower 13. The accommodating portion 24 has a substantially cylindrical shape and is disposed concentrically with the support shaft 22. A rod cam portion 25 for rotating the pushrod 10 and a follower cam portion 26 for rotating the follower 13 independently of the pushrod 10 are provided in the accommodating portion 24. The pushrod 10 is provided with a slider 40, which is brought into engagement with the rod cam portion 25 to make up a cam mechanism. Additionally, the follower 13 is provided with a plurality of sliders 41, which are brought into engagement with the follower cam portion 26 to make up a cam mechanism.

Hereinafter, a cam mechanism for rotating the pushrod 10 and the follower 13 will be described.

Figure 5:
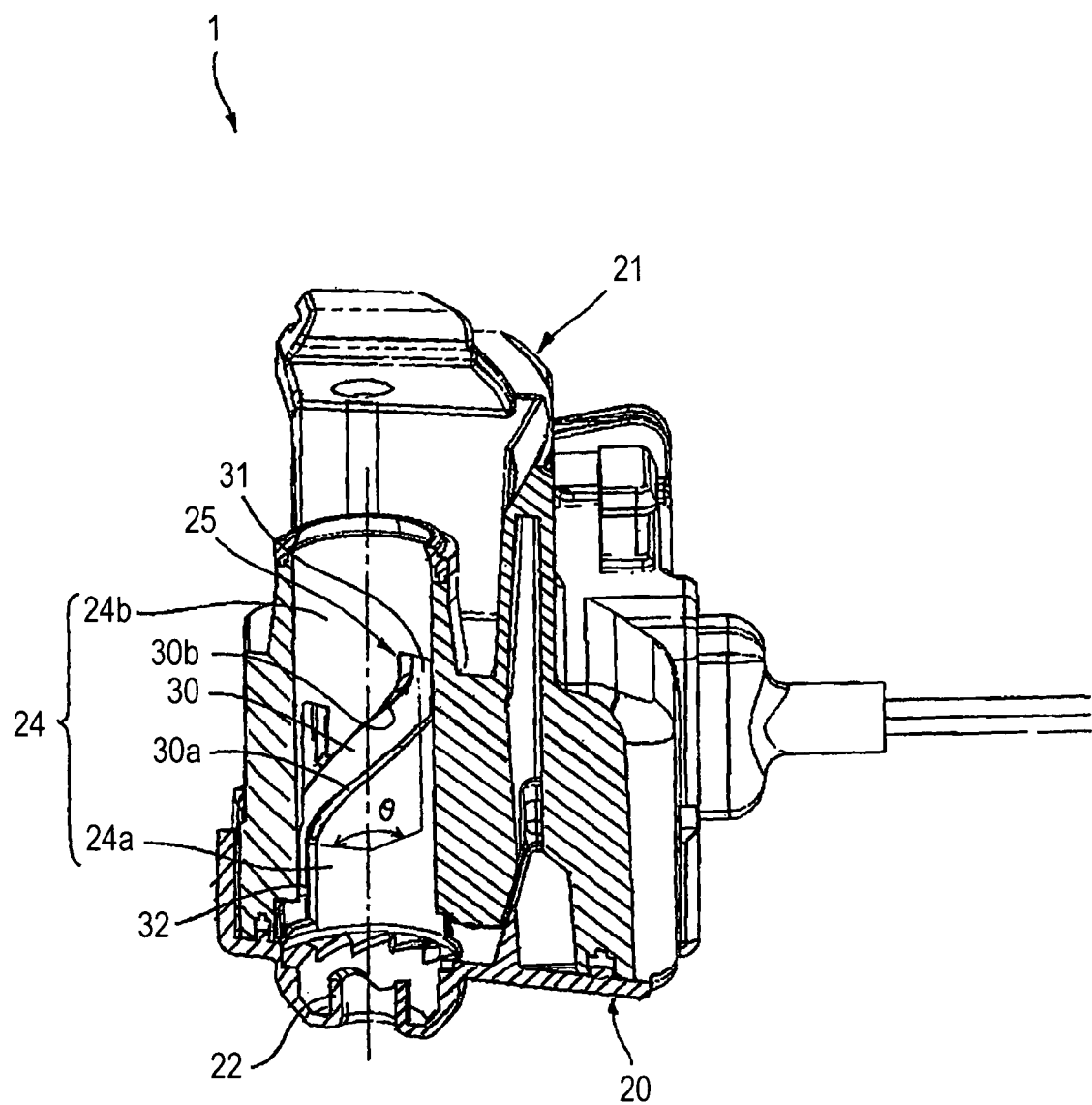
FIG. 5 A sectional view taken along a line V-V in FIG. 3 showing the configuration of a rod cam portion for rotating the pushrod of the opening and closing apparatus shown in FIG. 3.
Figure 6:
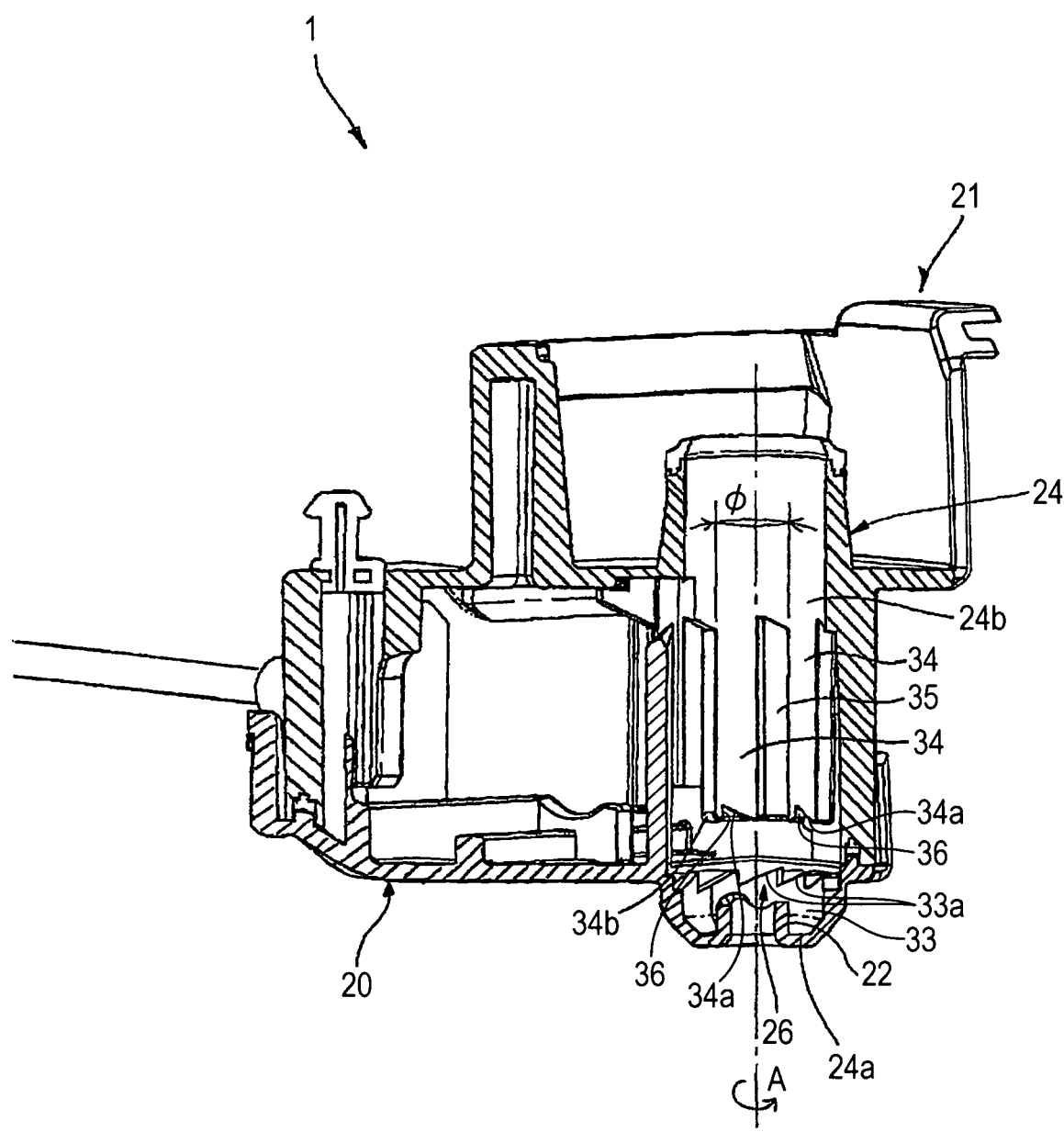
FIG. 6 A sectional view taken along a line VI-VI in FIG. 3 showing the configuration of a follower cam for rotating a follower of the opening and closing apparatus shown in FIG. 3.
Figure 7:
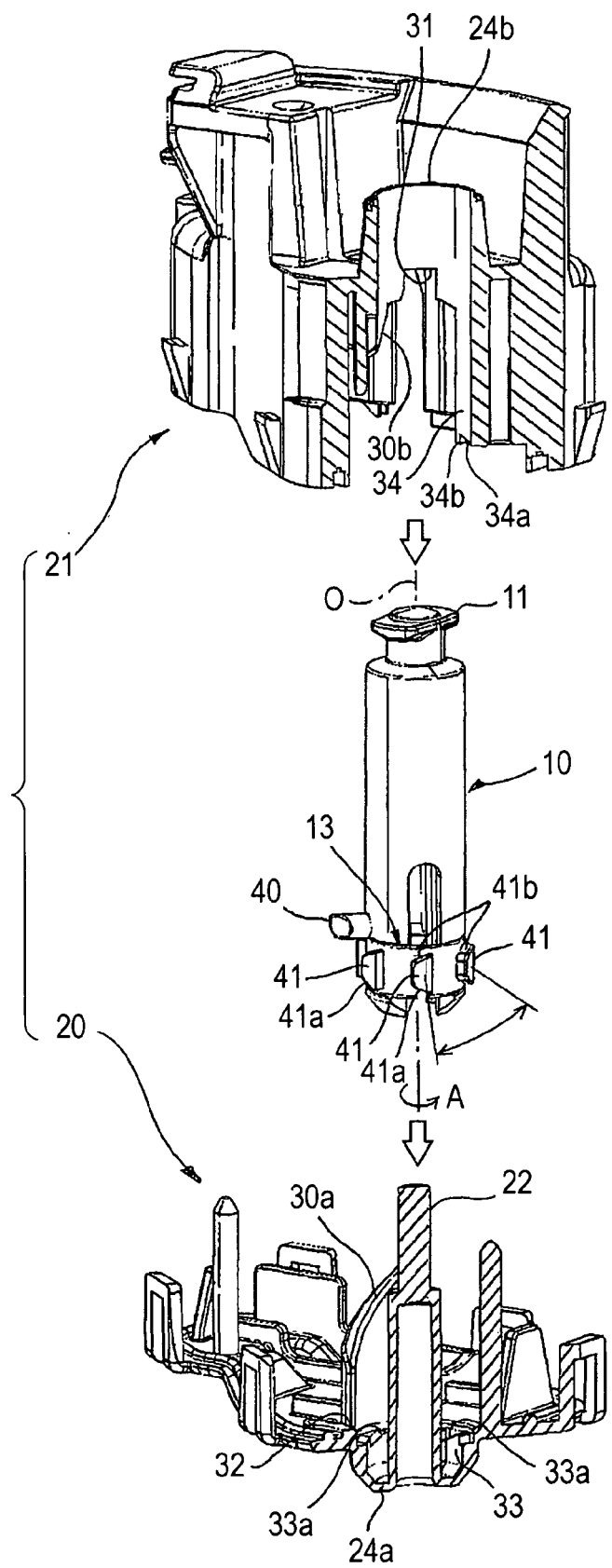
FIG. 7 An exploded partially sectional perspective view showing the configuration of the pushrod and the follower of the opening and closing apparatus shown in FIG. 3.
Figure 8:
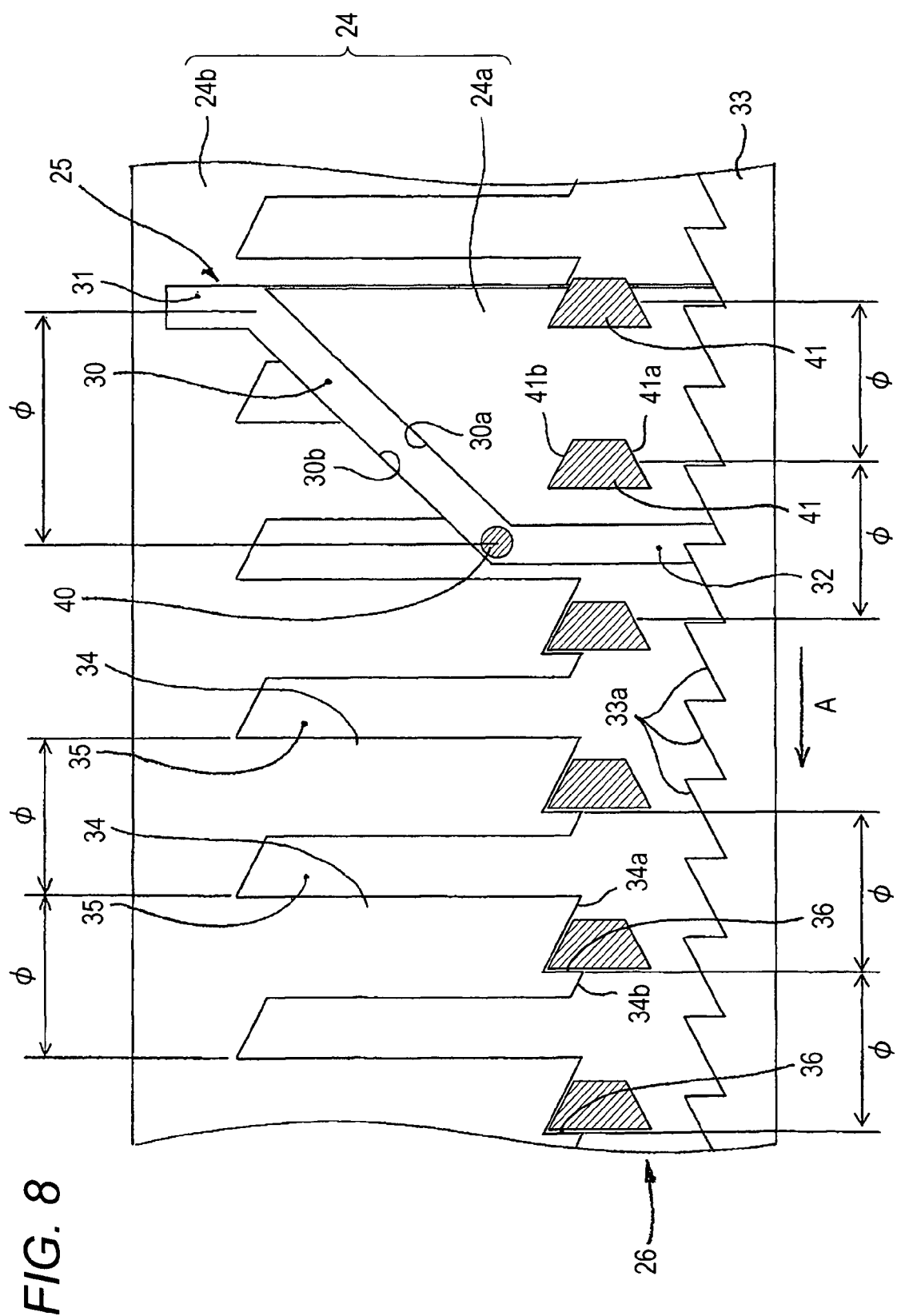
FIG. 8 A diagram showing exemplarily an engagement between the pushrod and the rod cam portion and an engagement between the follower and the follower cam portion of the opening and closing apparatus shown in FIG. 3.

FIG. 5 shows the configuration of the rod cam portion 25, and FIG. 6 shows the configuration of the follower cam portion 26. Incidentally, in FIGS. 5 and 6, the support shaft 22 is shown as being partially sectioned. In addition, FIG. 7 is an exploded partially sectional perspective view showing the configuration of the pushrod 10 and the follower 13, as well as an example of a method of assembling the pushrod 10 and the follower 13 into the case 16. Additionally, FIG. 8 is a diagram showing exemplarily an engagement between the pushrod 10 and the rod cam portion 25 and an engagement between the follower 13 and the follower cam portion 26. Incidentally, in FIG. 8, the pushrod 10 and the follower 13 are not shown but are represented by their sliders 40, 41, respectively.

As shown in FIG. 5, the rod cam portion 25 includes a cam hole 30 and guide holes 31, 32, which are formed in the accommodating portion 24 for establishing a communication between an interior and an exterior thereof.

The cam hole 30 is formed so as to extend spirally about the support shaft 22. A turning angle θ of the cam hole 30 is set to an angle (substantially 90°) which corresponds to a rotational angle θ of the pushrod 10 when the pushrod 10 shifts from the unlocking posture to the locking posture and also shifts oppositely from the locking posture and the unlocking posture.

The guide hole 31 connects to an end of the cam hole 30 which is situated to face a distal end of the support shaft 22 and is formed so as to extend along the support shaft 22. The guide hole 32 connects to an end of the cam hole 30 which is situated to face a proximal end of the support shaft 22 and is formed so as to extend along the support shaft 22.

As shown in FIG. 6, the follower cam portion 26 includes a first cam projection 33 and a plurality of second cam projections 34 which are formed so as to project radially inwards of the accommodating portion 24. Further, a plurality of follower guide portions 35 and a plurality of follower securing portions 36 are provided on the follower cam portion 26. The follower guide portions 35 are configured to guide an axial movement of the follower 13 which occurs in association with an axial movement of the pushrod 10 when it reciprocates between the pushed-in position P1 and the pushed-out position P2. The follower securing portions 36 are configured to secure the follower 13 so as to hold the pushrod 10 in the pushed-in position P1 against a biasing effort by the coil spring 14.

The first cam projection 33 is provided at a bottom of the accommodating portion 24 and has a ring shape. An end portion of the first cam projection 33 which is situated to face the distal end of the support shaft 22 is provided with cam surfaces 33a, which are so formed to have a downward gradient in a predetermined rotational direction A about the support shaft 22, are formed repeatedly.

The second cam projections 34 are formed so as to extend along the support shaft 22 and are disposed apart from the first cam projection 33 in an axial direction of the support shaft 22 while being spaced apart from each other around the support shaft 22 at intervals of a predetermined angle φ. Cam surfaces 34a, 34b are formed individually at end portions of the second cam projections 34 which are situated to face the proximal end of the support shaft 22, and the cam surfaces 34a, 34b are so formed to have an upward gradient in the rotational direction A, which is opposite to the downward gradient imparted to the cam surfaces 33a of the first cam projection 33. Both the cam surfaces 34a, 34b are not continuous, and a difference in level or a riser-like section is provided therebetween in the axial direction of the support shaft 22. Incidentally, in this embodiment, the angle φ at which the second cam projections 34 are spaced apart from each other is substantially 60°.

The follower guide portions 35 are each configured as a groove extending along the support shaft 22 between any two adjacent second cam projections 34.

The follower securing portions 36 are provided at the end portions of the second cam projections 34 where the cam surfaces 34a, 34b are formed. In the illustrated example, the follower securing portions 36 are each configured as a difference in level or a riser-like section between both the cam surfaces 34a, 34b. Incidentally, each of the follower securing portions 36 may be configured as a groove which extends along the support shaft 22 between both the cam surfaces 34a, 34b.

As referred to in FIG. 8, the follower guide portions 35 and the follower securing portions 36 are disposed alternately. In the group of follower guide portions 35, the follower guide portions 35 are disposed at intervals of an angle φ around the support shaft 22 to match the disposition of the second cam projections 34. Similarly, in the group of follower securing portions 36, the follower securing portions 36 are disposed at intervals of an angle φ around the support shaft 22 to match the disposition of the second cam projections 34. Further, the follower guide portions 35 and the follower securing portions 36 are individually disposed directly above a lower edge of any of the cam surfaces 33a of the first cam projection 33 in such a manner that the follower guide portion 35 and the follower securing portion 36 extend over any two cam surfaces 33a which lie adjacent to each other in the rotational direction A.

As shown in FIGS. 7 and 8, the slider 40 of the pushrod 10 is formed on the pushrod 10 so as to project radially outwards therefrom and is inserted through the cam hole 30 in the rod cam portion 25. Then, the slider 40 slides on a side surface (a cam surface) of the cam hole 30 which is oriented towards the distal end of the support shaft 22 as the pushrod 10 is moved in the pushed-in direction, whereas as the pushrod 10 is moved in the pushed-out direction, the slider slides on a side surface (a cam surface) 30b of the cam hole 30 which is oriented towards the proximal end of the support shaft 22. Thus, the slider 40 is moved in this way as the pushrod 10 is pushed in and out, whereby the pushrod 10 is rotated forwards and backwards.

The plurality of sliders 41 of the follower 13 are formed on the follower 13 so as to project radially outwards therefrom and are disposed around the center line O of the pushrod 10 at intervals of an angle φ so as to be spaced apart from each other. The sliders 41 are accommodated between the first cam projection 33 and the second cam projections 34 of the follower cam portion 26. The sliders 41 slide individually on the cam surfaces 33a of the first cam projection 33 as the pushrod 10 is moved in the pushed-in direction. Further, the sliders 41 slide individually on the cam surfaces 34a, 34b of the second cam projections 34 as the pushrod 10 is moved in the pushed-out direction. Thus, the follower 13 is rotated in the rotational direction A as the sliders 41 slide in the way described above. Incidentally, contact surfaces 41a of the sliders 41 which are brought into sliding contact with the cam surfaces 33a are made into an inclined surface which matches the cam surface 33a, and contact surfaces 41b of the sliders 41 which are brought into sliding contact with the cam surfaces 34a, 34b are made into an inclined surface which matches the cam surfaces 34a, 34b.

Here, to describe the accommodating portion 24 specifically, the accommodating portion 24 is divided along the cam hole 30 and the guide holes 31, 32 in the rod cam portion 25 into such two halves as a first portion 24a and a second portion 24b.

The first portion 24a is provided in the base portion 20. The first portion 24a includes a side surface 30a of the cam hole 30, on which the slider 40 of the pushrod 10 slides, and cam surfaces 33a of the first cam projection 33, on which the sliders 41 of the follower 13 slide, as the pushrod 10 is moved in the pushed-in direction.

The second portion 24b is provided in the holder 21. The second portion 24b includes a side surface 30b of the cam hole 30, on which the slider 40 of the pushrod 10 slides, and cam surfaces 34a, 34b of the second cam projections 34, on which the sliders 41 of the follower 13 slide, as the pushrod 10 is moved in the pushed-out direction.

In the configuration described above, when the holder 21 is assembled to the base 20 with the pushrod 10 and the follower 13 fitted on the support shaft 22, the slider 40 of the pushrod 10 is inserted through the cam hole 30 by itself, and the plurality of sliders 41 of the follower 13 are disposed individually between the first cam projection 33 and the corresponding second cam projections 34 of the plurality of second cam projections 34, and thus the pushrod 10 and the follower 13 are accommodated in the accommodating portion 24. This facilitates the fabrication of the opening and closing apparatus 1.

FIGS. 9A to 9E show exemplarily an operation of the cam mechanism which is triggered in association with a forward motion of the pushrod 10 from the pushed-out position P2 to the pushed-in position P1. FIGS. 10A to 10E show exemplarily an operation of the cam mechanism which is triggered in association with a backward motion of the pushrod 10 from the pushed-in position P1 to the pushed-out position. In FIGS. 9A to 9E and 10A to 10E, only one of the plurality of sliders 41 of the follower 13 is shown with the remains thereof omitted from illustration.

Firstly, the operation of the cam mechanism which is triggered in association with the forward motion of the pushrod 10 will be described.

As shown in FIG. 9A, when the pushrod 10 is in the pushed-out position P2, the slider 40 of the pushrod 10 is positioned in the guide hole 31 in the rod cam portion 25, and the slider 41 of the follower 13 is positioned in the follower guide portion 35 in the follower cam portion 26. Incidentally, in the illustrated example, by bringing the slider 41 into abutment with an end face 35a of a closed end of the follower guide portion 35, the follower 13 is secured, whereby the pushrod 10 is held in the pushed-out position P2.

As shown in FIG. 9B, the pushrod 10 is pushed in as a result of the fuel lid 3 being pushed in. The slider 40 of the pushrod 10 enters the cam hole 30 as the pushrod 10 moves in the pushed-in direction. On the other hand, the slider 41 of the follower 13 still remains in the follower guide portion 35.

Then, as shown in FIG. 9C, the slider 40 of the pushrod 10 slides on the side surface 30a of the cam hole 30 as the pushrod 10 moves further in the pushed-in direction. According thereto, the pushrod 10 is rotated by an angle corresponding to the turning angle $\theta$ of the cam hole 30. While the pushrod 10 is rotated so, the pushrod 10 brings the lid securing portion 11 into engagement with the fuel lid 3 so as to lock the fuel lid 3. On the other hand, the slider 41 of the follower 13 still remains in the follower guide portion 35, whereby the follower 13 is moved axially without being rotated.

Then, as shown in FIG. 9D, the slider 40 of the pushrod 10 enters the guide hole 32 as the pushrod 10 moves further in the pushed-in direction. Thereafter, the pushrod 10 moves axially without being rotated. On the other hand, the slider 41 of the follower 13 departs from the follower guide portion 35 to bring the sliding contact surface 41a into engagement with the cam surface 33a of the first cam projection 33 which lies therebelow and slides on the cam surface 33a. According thereto, the follower 13 is rotated in the rotational direction A.

Then, as shown in FIG. 9E, when the pushing on the fuel lid 3 is released, the pushrod 10 is biased by the coil spring 14 to thereby be moved in the pushed-out direction. When the pushrod 10 moves in the pushed-out direction in this way, the sliding contact surface 41b of the slider 41 is brought into engagement with the cam surface 34a of the second cam projection 34 which is situated thereabove, and the slider 41 of the follower 13 slides on the cam surface 34a. The follower 13 is rotated by the angle $\phi 1$ in the rotational direction A by the engagement of the slider 41 with the cam surfaces 33a, 34a, bringing the slider 41 into engagement with the follower securing portion 36, whereby the follower 13 is secured by the follower securing portion 36. Thus, the pushrod 10 is held in the pushed-in position P1.

Next, the operation of the cam mechanism which is triggered by the backward motion of the pushrod 10 will be described.

As shown in FIG. 10A, when the pushrod 10 in the pushed-in position P1, the slider 40 of the pushrod 10 is positioned in the guide hole 32 in the rod cam portion 25. Further, the slider 41 of the follower 13 is positioned at the follower securing portion 36 of the follower cam portion 26.

As shown in FIG. 10B, when the fuel lid 3 is pushed in, the pushrod 10 is pushed in once. Then, as the pushrod 10 moves in the pushed-in direction, the slider 41 of the follower 13 is disengaged from the follower securing portion 36 and slides on the cam surface 33a of the first cam projection 33 which is situated therebelow with the sliding contact surface 41a thereof brought into engagement with the cam surface 33a. According thereto, the follower 13 is rotated in the rotational direction A. On the other hand, the slider 40 of the pushrod 10 still remains in the guide hole 32, and the pushrod 10 is moved axially without being rotated.

Then, as shown in FIG. 10C, when the pushing on the fuel lid 3 is released, the pushrod 10 is biased by the coil spring 14 to thereby be moved in the pushed-out direction. As the pushrod 10 moves in the pushed-out direction, the slider 41 of the follower 13 slides on the cam surface 34b of the second cam projection 34 which is situated thereabove with the sliding contact surface 41b thereof brought into engagement with the cam surface 34b. Thus, the engagement of the slider 41 with the cam surfaces 33a, 34b rotates the follower 13 by the angle $\phi 2$ in the rotational direction A, whereby the slider 41 enters the follower guide portion 35.

Then, as shown in FIG. 10D, as the pushrod 10 moves further in the pushed-out direction, the slider 40 of the pushrod 10 enters the cam hole 30 and slides on the side surface 30b of the cam hole 30. According thereto, the pushrod 10 is rotated by an angle corresponding to the turning angle $\theta$ of the cam hole 30. As this occurs, the pushrod 10 disengages the lid securing portion 11 from the fuel lid 3 as has been described above, whereby the fuel lid 3 is unlocked.

Then, as shown in FIG. 10E, the slider 41 of the follower 13 is brought into abutment with the end face 35a of the closed end of the follower guide portion 35, whereby the follower 13 is secured. According thereto the pushrod 10 is held in the pushed-out position P2.

The operations of the cam mechanism are repeated alternately every time the fuel lid 3 is pushed in, and the pushrod 10 is rotated by the angle $\theta$ forwards and backwards alternately, while the follower 13 is rotated by the angle $\phi 1$ and the angle $\phi 2$ alternately in the rotational direction A. Then, when the fuel lid 3 is pushed in twice, the pushrod 10 reciprocates once between the pushed-in position P1 and the pushed-out position P2. In the process of this reciprocating motion, the pushrod 10 is rotated by the angle $\theta$ forwards and backwards to be restored to its original posture, and the follower 13 is rotated by the angle $\phi(\phi=\phi 1+\phi 2)$, which corresponds to the angular intervals at which the follower guide portions 35 and the follower securing portions 36 are disposed and also to the angular intervals at which the plurality of sliders 41 are disposed, and is then restored to its original posture. In the illustrated example, the angle $\phi 1$ at which the follower 13 is rotated during the forward motion of the pushrod 10 and the angle $\phi 2$ at which the follower 13 is rotated during the backward motion of the pushrod 10 are each set to substantially 30°. However, these angles may be different.

Here, the rotating angles $\phi 1$, $\phi 2$ (substantially 30°) of the follower 13 and the rotating angle $\theta$ (substantially 90°) of the pushrod 10 are different from each other, and it is set so that the rotating angles $\phi 1$, $\phi 2$ of the follower 13 become relatively small, while the rotating angle $\theta$ of the pushrod 10 becomes relatively large. By setting the rotating angles $\phi 1$, $\phi 2$ of the follower to the relatively small angle, axial lengths 11, 12, 13 of the cam surfaces 33a, 34a, 34b can be made shorter than an axial length L of the side surfaces 30a, 30b of the cam hole 30 while maintaining the gradients of the cam surfaces 33a, 34a, 34b to gradients which are good enough to rotate the follower 13 in a smooth fashion, thereby making it possible to reduce the size of the opening and closing apparatus 1. Meanwhile, by setting the rotating angle $\theta$ of the pushrod 10 to the relatively large angle, it is possible to enhance the locking strength of the fuel lid 3 while ensuring a sufficient engaging margin between the lid securing portion 11 of the pushrod 10 and the secured portion 12 of the fuel lid 3.

Further, during the forward motion of the pushrod 10 shown in FIGS. 9A to 9E, the slider 40 of the pushrod 10 engages with the side surface 30a of the cam hole 30, and thereafter, the sliders 41 of the follower 13 engage with the cam surfaces 33a of the first cam projection 33. Thus, the pushrod 10 starts to rotate earlier than the follower 13. By causing the pushrod 10 to start to rotate earlier than the follower 13, it is possible to ensure such a sufficient engaging margin as to maintain the engagement between the lid securing portion 11 of the pushrod 10 and the secured portion 12 of the fuel lid 3 at a point in time when the follower 13 starts to rotate. According thereto, in the event that the pushing of the fuel lid 3 is interrupted just before the pushrod 10 is pushed in most deeply, although the pushrod 10 is biased by the coil spring 14 to be moved in the pushed-out direction, it is possible to prevent the lid securing portion 11 from being disengaged from the secured portion 12 by a shock caused by the engagement of the sliders 41 of the follower 13 with the cam surfaces 34a of the second cam projections 34 which occurs when the pushrod 10 is biased to be moved so. Thus, it is possible to prevent only the pushrod 10 from being kept held in the pushed-in position P1. It is preferable that the sliders 41 come into engagement with the cam surfaces 33a of the first cam projection 33 to thereby start the rotation of the follower 13 at the same time that the slider 40 is disengaged from the side surface 30a of the cam hole 30, causing the pushrod 10 to finish rotating or after the pushrod 10 has finished rotating.

Incidentally, the relation of timings at which the pushrod 10 and the follower 13 start to rotate during the forward motion of the pushrod 10 may be set as required based on the relation between an axial distance D1, which is between the slider 40 of the pushrod 10 and the sliders 41 of the follower 13, and an axial distance d1 between an upper edge of the side surface 30a of the cam hole 30 and upper edges of the cam surfaces 33a of the first cam projection 33. Here, the upper edge of the side surfaces 30a configures a starting point of the engagement thereof with the slider 40, and the upper edges of the cam surfaces 33a of the first cam projection 33 configure a starting point of the engagement thereof with the sliders 41. Then, by making the distance d1 larger than the distance D1, the pushrod 10 is allowed to start to rotate earlier than the follower 13.

Further, during the backward motion of the pushrod 10 shown in FIGS. 10A to 10E, the sliders 41 of the follower 13 are disengaged from the cam surfaces 34b of the second cam projections 34, and thereafter, the slider 40 of the pushrod 10 is disengaged from the side surface 30b of the cam hole 30. The follower 13 finishes rotating earlier than the pushrod 10. By allowing the follower 13 to finish rotating earlier than the pushrod 10, the engagement of the lid securing portion 11 of the pushrod 10 with the secured portion 12 of the fuel lid 3 can be maintained at a point in time when the sliders 41 of the follower 13 are brought into engagement with the follower guide portions 35, whereby it is possible to prevent the fuel lid 3 pushed out by the pushrod 10 from being spring opened. It is preferable that the slider 40 engages with the side surface 30b of the cam hole 30, causing the pushrod 10 to start rotating at the same time that the sliders 41 are disengaged from the cam surfaces 34b of the second cam projections 34, causing the follower 13 to finish rotating or after the follower 13 has finished rotating.

Incidentally, the relation of timings at which the pushrod 10 and the follower 13 finish rotating during the backward motion of the pushrod 10 may be set as required based on the relation between an axial distance D2, which is between the slider 40 of the pushrod 10 and the sliders 41 of the follower 13, and an axial distance d2 between an upper edge of the side surface 30b of the cam hole 30 and upper edges of the cam surfaces 34b of the second cam projections 34. Here, the upper edge of the side surface 30b of the cam hole 30 configures a terminating point of the engagement thereof with the slider 40, and the upper edges of the cam surfaces 34b of the second cam projections 34 configure a terminating point of the engagement thereof with the sliders 41. Then, by making the distance d2 larger than the distance D2, the follower 13 is allowed to finish rotating earlier than the pushrod 10.

Next, the locking portion 15 will be described.

Figure 11:
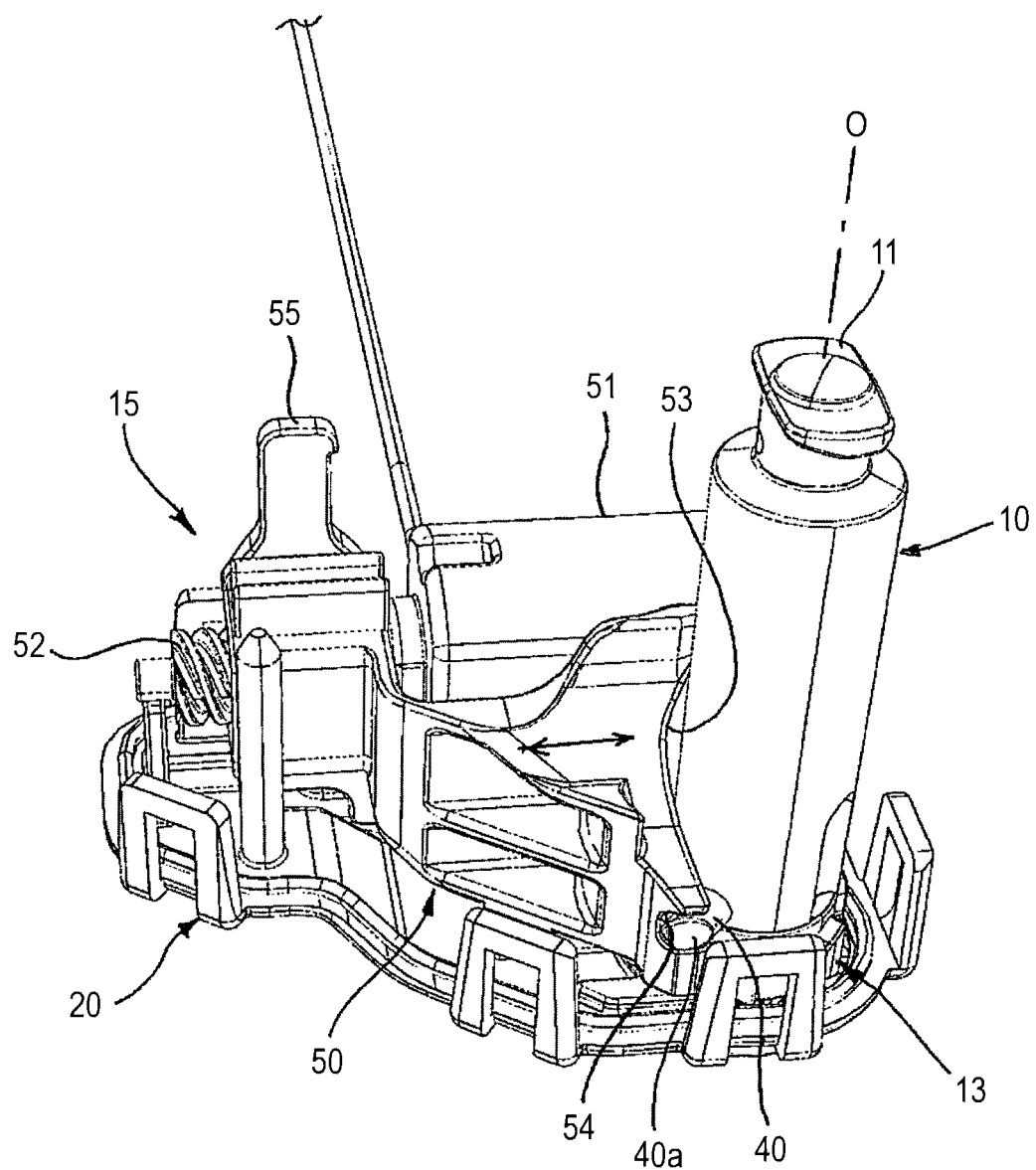
FIG. 11 A diagram showing the configuration of a locking portion which locks the pushrod of the opening and closing apparatus shown in FIG. 3.
Figure 12:
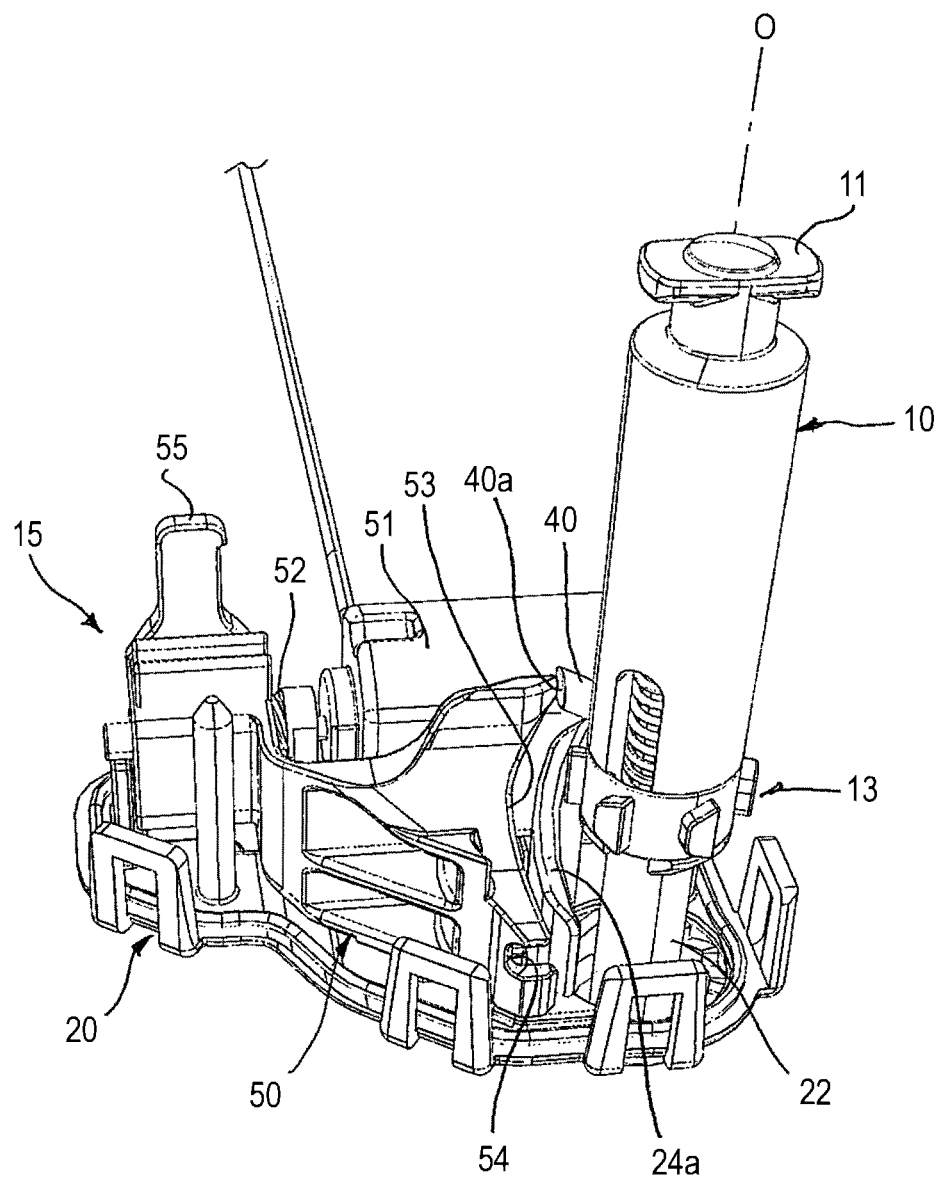
FIG. 12 A diagram showing the operation of the locking portion shown in FIG. 11.

FIGS. 11 and 12 show the configuration of the locking portion 15.

The locking portion 15 includes a securing member 50 configured to secure the pushrod 10, and a motor 51 and a worm gear 52 configured to drive the securing member 50.

The motor 51 is controlled by a control unit of the vehicle, not shown, and is configured to drive the securing member 50 such that the pushrod 10 is secured when the doors are locked while the pushrod 10 is released when the doors are unlocked in connection with locking and unlocking operations of door latch units provided in doors of the vehicle.

The securing member 50 is supported on the base 20 so as to move back and forth in directions which are substantially at right angles to the center line O of the pushrod 10. The securing member 50 is moved by the motor 51 and the worm gear 52. A securing portion 53 is provided on the securing member 50. The securing portion 53 is formed so as to follow an outer circumference of the first portion 24a which makes up the accommodating portion 24. A securing groove 54 having a pair of opposite side surfaces intersecting a direction in which the guide hole 32 extends while overlapping the guide hole 32 of the accommodating portion 24 (see FIG. 5) is formed in the securing portion 53.

When the pushrod 10 stays in the pushed-in position where the fuel lid 3 is locked in a closed state, the slider 40 of the pushrod 10 is positioned in the guide hole 32 in the accommodating portion 24 as has been described above, projecting radially outwards of the accommodating portion 24 through the guide hole 32. In this state, when the securing member 50 is moved towards the pushrod 10, the slider 40 is accommodated in the securing groove 54 and is held immovable by being surrounded by opposite side surfaces of the guide hole 32 and the opposite side surfaces of the securing groove 54. According thereto, the pushrod 10 is locked in such a state that it is held in the pushed-in position P1, ensuring further that the fuel lid 3 is locked in the closed state.

On the other hand, when the pushrod 10 stays in the pushed-out position P2, the slider 40 of the pushrod 10 is positioned in the guide hole 31 in the accommodating portion 24 as has been described above, projecting radially outwards of the accommodating portion 24 through the guide hole 31. In this state, even though the securing member 50 is moved towards the pushrod 10, the securing portion 53 is brought into abutment with an end face 40a of the slider 40, whereby the securing member 50 is prevented from moving. According thereto, an erroneous locking of the pushrod 10 can be prevented.

In this way, in the event that the pushrod 10 is locked while the slider 40 is secured by the securing member 50, it is not necessary for the pushrod 10 to be provided with an engagement portion for engagement with the securing member 50, separately. Therefore, it is possible to simplify the configuration of the pushrod 10.

Incidentally, an operating portion 55 is provided on the securing member 50 so as to be exposed to the outside of the case 16. In case where an electric system of the vehicle fails and a problem occurs in driving the motor 51, for example, the engagement of the pushrod 10 with the securing member 50 can be canceled by manually operating the operating portion 55.

As described above, in the opening and closing apparatus 1, the pushrod 10 and the follower 13 are made to rotate independently of each other as a result of the axial movement of the pushrod 10, whereby it is possible to set properly the angle and timing at which the pushrod 10 is rotated to lock and unlock the fuel lid 3, as well as the angle and timing at which the follower 13 is rotated to hold the pushrod 10 in the pusher in position P1. According thereto, the reliability in operation of the opening and closing apparatus 1 can be enhanced.

Further, in the opening and closing apparatus 1, the follower 13 is assembled to the pushrod 10 so as not only to rotate relative to the pushrod 10 and but also to move axially together with the pushrod 10, this obviating the necessity of a link which transmits an axial movement of the pushrod 10 to the follower 13, thereby making it possible to reduce the size of the opening and closing apparatus 1.

Incidentally, the above-described configuration of the opening and closing apparatus 1 may also be applied to an opening and closing apparatus for a flap such as a door or a lid which opens and closes in front-to-rear directions.

According to the disclosure of the invention, the following matters are disclosed.

(1) An opening and closing apparatus for a fuel lid, comprising: a pushrod having a securing portion for securing the fuel lid, wherein the pushrod is rotatable about a center line so as to shift between a locking posture where the securing portion is brought into engagement with the fuel lid and an unlocking posture where the securing portion is disengaged from the fuel lid, and wherein the pushrod is also movable in axial directions so as to reciprocate between a pushed-in position where the fuel lid is closed and a pushed-out position where the fuel lid is opened; a follower assembled to the pushrod so as to rotate relatively to the pushrod about the center line and to move together with the pushrod in the axial directions; a biasing member configured to bias the pushrod in a direction in which the pushrod is pushed out; and a case configured to support the pushrod, the follower and the biasing member, wherein the case comprises: a rod cam portion configured to rotate the pushrod to the locking posture in response to a forward motion of the pushrod from the pushed-out position to the pushed-in position and to rotate the pushrod to the unlocking posture in response to a backward motion of the pushrod from the pushed-in position to the pushed-out position; and a follower cam portion configured to rotate the follower in a predetermined rotational direction about the center line in response to the forward motion and the backward motion of the pushrod, and wherein the follower cam portion comprises a plurality of follower securing portions configured to secure the follower so as to hold the pushrod in the pushed-in position against biasing force exerted by the biasing member, wherein the plurality of follower securing portions are provided at intervals of a rotational angle of the follower rotating about the center line in association with one reciprocating movement of the pushrod between the pushed-in position and the pushed-out position.

(2) The opening and closing apparatus according to (1), wherein a rotating angle at which the follower rotates in association with the forward motion or the backward motion of the pushrod and a rotating angle of the pushrod between the locking posture and the unlocking posture are different from each other.

(3) The opening and closing apparatus according to (2), wherein the rotating angle at which the follower rotates in association with the forward motion or the backward motion of the pushrod is smaller than the rotating angle of the pushrod between the locking posture and the unlocking posture.

(4) The opening and closing apparatus according to (3), wherein a length in the axial direction of a cam surface of the follower cam portion which is brought into sliding contact with the follower as the follower rotates is shorter than a length in the axial direction of a cam surface of the rod cam portion which is brought into sliding contact with the pushrod as the pushrod rotates.

(5) The opening and closing apparatus according to (1), wherein in the forward motion of the pushrod, a timing at which the cam surface of the rod cam portion which is brought into sliding contact with the pushrod as the pushrod rotates is brought into engagement with the pushrod and a timing at which the cam surface of the follower cam portion which is brought into sliding engagement with the follower as the follower rotates is brought into engagement with the follower are different from each other.

(6) The opening and closing apparatus according to (5), wherein the pushrod is brought into engagement with the cam surface of the rod cam portion, and thereafter, the follower is brought into engagement with the cam surface of the follower cam portion.

(7) The opening and closing apparatus according to (6), wherein the pushrod is disengaged from the cam surface of the rod cam portion, and at the same time or thereafter, the follower is brought into engagement with the cam surface of the follower cam portion.

(8) The opening and closing apparatus according to (1), wherein in the backward motion of the pushrod, a timing at which the pushrod is disengaged from the cam surface of the rod cam portion which is brought into sliding contact with the pushrod as the pushrod rotates and a timing at which the follower is disengaged from the cam surface of the follower cam portion which is brought into sliding contact with the follower as the follower rotates are different from each other.

(9) The opening and closing apparatus according to (8), wherein the follower is disengaged from the cam surface of the follower cam portion, and thereafter, the pushrod is disengaged from the cam surface of the rod cam portion.

(10) The opening and closing apparatus according to (9), wherein the follower is disengaged from the cam surface of the follower cam portion, and at the same time or thereafter, the pushrod is brought into engagement with the cam surface of the rod cam portion.

(11) The opening and closing apparatus according to (1), wherein the follower is formed into a ring and fits on the pushrod.

(12) The opening and closing apparatus according to (1), wherein the case comprises a first member and a second member that is assembled to the first member in the axial direction, wherein a cam surface of the rod cam portion on which the pushrod slides and a cam surface of the follower cam portion on which the follower slides when the pushrod is moved in a direction in which the pushrod is pushed in are provided on the first member, and wherein a cam surface of the rod cam portion on which the pushrod slides and a cam surface of the follower cam portion on which the follower slides when the pushrod is moved in the direction in which the pushrod is pushed out are provided on the second member.

(13) The opening and closing apparatus according to (1), further comprising a locking portion configured to lock the pushrod in such a state that the pushrod is held in the pushed-in position.

(14) The opening and closing apparatus according to (13), wherein the locking portion is configured to secure an engagement portion with the rod cam portion of the pushrod.

(15) An opening and closing apparatus for a flap, comprising: a pushrod having a securing portion for securing the flap which opens and closes in front-to-rear directions, wherein the pushrod is rotatable about a center line so as to shift between a locking posture where the securing portion is brought into engagement with the flap and an unlocking posture, and wherein the pushrod is also movable along the center line so as to reciprocate between a pushed-in position where the flap is closed and a pushed-out position where the flap is opened; a follower assembled to the pushrod so as to rotate relatively to the pushrod about the center line and to move together with the pushrod in axial directions; a biasing member configured to bias the pushrod in a direction in which the pushrod is pushed out; and a case configured to support the pushrod, the follower and the biasing member, wherein the case comprises: a rod cam portion configured to rotate the pushrod to the locking posture in response to a forward motion of the pushrod from the pushed-out position to the pushed-in position and to rotate the pushrod to the unlocking posture in response to a backward motion of the pushrod from the pushed-in position to the pushed-out position; and a follower cam portion configured to rotate the follower in a predetermined rotational direction about the center line in response to the forward motion and the backward motion of the pushrod, and wherein the follower cam portion comprises a plurality of follower securing portions configured to secure the follower so as to hold the pushrod in the pushed-in position against biasing force exerted by the biasing member, wherein the plurality of follower securing portions are provided at intervals of a rotational angle of the follower rotating about the center line in association with one reciprocating movement of the pushrod between the pushed-in position and the pushed-out position.

The invention claimed is:

1. An opening and closing apparatus for a fuel lid, comprising:
   a pushrod having a securing portion for securing the fuel lid, wherein the pushrod is rotatable about a center line so as to shift between a locking posture where the securing portion is brought into engagement with the fuel lid and an unlocking posture where the securing portion is disengaged from the fuel lid, and wherein the pushrod is also movable in axial directions so as to reciprocate between a pushed-in position where the fuel lid is closed and a pushed-out position where the fuel lid is opened;
   a follower assembled to the pushrod so as to rotate relatively to the pushrod about the center line and to move together with the pushrod in the axial directions;
   a biasing member configured to bias the pushrod in a direction in which the pushrod is pushed out; and
   a case configured to support the pushrod, the follower and the biasing member,
   wherein the case comprises:
      a rod cam portion configured to rotate the pushrod to the locking posture in response to a forward motion of the pushrod from the pushed-out position to the pushed-in position and to rotate the pushrod to the unlocking posture in response to a backward motion of the pushrod from the pushed-in position to the pushed-out position; and
      a follower cam portion configured to rotate the follower in a predetermined rotational direction about the center line in response to the forward motion and the backward motion of the pushrod, and
   wherein the follower cam portion comprises a plurality of follower securing portions configured to secure the follower so as to hold the pushrod in the pushed-in position against biasing force exerted by the biasing member, wherein the plurality of follower securing portions are provided at intervals of a rotational angle of the follower rotating about the center line in association with one reciprocating movement of the pushrod between the pushed-in position and the pushed-out position.

2. The opening and closing apparatus according to claim 1, wherein a rotating angle at which the follower rotates in association with the forward motion or the backward motion of the pushrod and a rotating angle of the pushrod between the locking posture and the unlocking posture are different from each other.

3. The opening and closing apparatus according to claim 2, wherein the rotating angle at which the follower rotates in association with the forward motion or the backward motion of the pushrod is smaller than the rotating angle of the pushrod between the locking posture and the unlocking posture.

4. The opening and closing apparatus according to claim 3, wherein a length in the axial direction of a cam surface of the follower cam portion which is brought into sliding contact with the follower as the follower rotates is shorter than a length in the axial direction of a cam surface of the rod cam portion which is brought into sliding contact with the pushrod as the pushrod rotates.

5. The opening and closing apparatus according to claim 1, wherein in the forward motion of the pushrod, a timing at which the cam surface of the rod cam portion which is brought into sliding contact with the pushrod as the pushrod rotates is brought into engagement with the pushrod and a timing at which the cam surface of the follower cam portion which is brought into sliding engagement with the follower as the follower rotates is brought into engagement with the follower are different from each other.

6. The opening and closing apparatus according to claim 5, wherein the pushrod is brought into engagement with the cam surface of the rod cam portion, and thereafter, the follower is brought into engagement with the cam surface of the follower cam portion.

7. The opening and closing apparatus according to claim 6, wherein the pushrod is disengaged from the cam surface of the rod cam portion, and at the same time or thereafter, the follower is brought into engagement with the cam surface of the follower cam portion.

8. The opening and closing apparatus according to claim 1, wherein in the backward motion of the pushrod, a timing at which the pushrod is disengaged from the cam surface of the rod cam portion which is brought into sliding contact with the pushrod as the pushrod rotates and a timing at which the follower is disengaged from the cam surface of the follower cam portion which is brought into sliding contact with the follower as the follower rotates are different from each other.

9. The opening and closing apparatus according to claim 8, wherein the follower is disengaged from the cam surface of the portion, and thereafter, the pushrod is disengaged from the cam surface of the rod cam portion.

10. The opening and closing apparatus according to claim 9, wherein the follower is disengaged from the cam surface of the follower cam portion, and at the same time or thereafter, the pushrod is brought into engagement with the cam surface of the rod cam portion.

11. The opening and closing apparatus according to claim 1, wherein the follower is formed into a ring and fits on the pushrod.

12. The opening and closing apparatus according to claim 1, wherein the case comprises a first member and a second member that is assembled to the first member in the axial direction, wherein a cam surface of the rod cam portion on which the pushrod slides and a cam surface of the follower cam portion on which the follower slides when the pushrod is moved in a direction in which the pushrod is pushed in are provided on the first member, and wherein a cam surface of the rod cam portion on which the pushrod slides and a cam surface of the follower cam portion on which the follower slides when the pushrod is moved in the direction in which the pushrod is pushed out are provided on the second member.

13. The opening and closing apparatus according to claim 1, further comprising:

a locking portion configured to lock the pushrod in such a state that the pushrod is held in the pushed-in position.

14. The opening and closing apparatus according to claim 13, wherein the locking portion is configured to secure an engagement portion with the rod cam portion of the pushrod.

15. An opening and closing apparatus for a flap, comprising:

a pushrod having a securing portion for securing the flap which opens and closes in front-to-rear directions, wherein the pushrod is rotatable about a center line so as to shift between a locking posture where the securing portion is brought into engagement with the flap and an unlocking posture, and wherein the pushrod is also movable along the center line so as to reciprocate between a pushed-in position where the flap is closed and a pushed-out position where the flap is opened;

a follower assembled to the pushrod so as to rotate relatively to the pushrod about the center line and to move together with the pushrod in axial directions;

a biasing member configured to bias the pushrod in a direction in which the pushrod is pushed out; and a case configured to support the pushrod, the follower and the biasing member, wherein the case comprises:

a rod cam portion configured to rotate the pushrod to the locking posture in response to a forward motion of the pushrod from the pushed-out position to the pushed-in position and to rotate the pushrod to the unlocking posture in response to a backward motion of the pushrod from the pushed-in position to the pushed-out position; and a follower cam portion configured to rotate the follower in a predetermined rotational direction about the center line in response to the forward motion and the backward motion of the pushrod, and wherein the follower cam portion comprises a plurality of follower securing portions configured to secure the follower so as to hold the pushrod in the pushed-in position against biasing force exerted by the biasing member, wherein the plurality of follower securing portions are provided at intervals of a rotational angle of the follower rotating about the center line in association with one reciprocating movement of the pushrod between the pushed-in position and the pushed-out position.

* * * * *